United States Patent
Lee et al.

(10) Patent No.: US 7,162,162 B2
(45) Date of Patent: Jan. 9, 2007

(54) METHOD AND APPARATUS OF CLOCK RECOVERY USING OPTICAL FILTERS

(75) Inventors: Jae-myoung Lee, Seoul (KR); Je-soo Ko, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 769 days.

(21) Appl. No.: 10/444,192

(22) Filed: May 23, 2003

(65) Prior Publication Data

US 2004/0067063 A1    Apr. 8, 2004

(30) Foreign Application Priority Data

Oct. 8, 2002   (KR) ..................... 10-2002-0061214

(51) Int. Cl.
*H04B 10/00*   (2006.01)
(52) U.S. Cl. ..................................... 398/155
(58) Field of Classification Search ............... 398/155, 398/154, 159, 85, 210; 375/355, 316; 327/50
See application file for complete search history.

(56) References Cited

U.S. PATENT DOCUMENTS

| | | | |
|---|---|---|---|
| 5,386,311 A | | 1/1995 | Shields |
| 5,761,228 A | * | 6/1998 | Yano ........................... 372/26 |
| 6,728,493 B1 | * | 4/2004 | Whittaker et al. .......... 398/155 |
| 7,035,538 B1 | * | 4/2006 | Willner et al. ................ 398/29 |
| 2004/0208615 A1 | * | 10/2004 | Kean ........................... 398/155 |

OTHER PUBLICATIONS

Bernd Franz "Optical signal processing for very high speed (>40Gbit/s) ETDM binary NRZ clock recovery" ALCATEL Corporate Research Center-Optical Systems and Networks; copyright 2000 Optical Society of America (MG1-1 - MG1-3).

* cited by examiner

*Primary Examiner*—Jason Chan
*Assistant Examiner*—Quan-Zhen Wang
(74) *Attorney, Agent, or Firm*—Blakely Sokoloff Taylor & Zafman

(57) ABSTRACT

A method and apparatus for optical clock recovery using optical filters with fixed reflective wavelengths is provided. In the apparatus, a first filter receives an optical signal and extracts one out of two spectral lines corresponding to two side peaks that are second in magnitude to a peak and exist at both sides of a peak on the spectrum of the received optical signal. A second filter extracts a spectral line corresponding the largest peak on the spectrum of the received optical signal. An attenuator equalizes the power levels of the two spectral lines extracted by the first and second filters. A beating generation unit receives signals corresponding to the two equalized spectral lines and generates beating between the equalized spectral lines, thereby recovering a clock component.

11 Claims, 6 Drawing Sheets

METHOD AND APPARATUS OF CLOCK RECOVERY USING OPTICAL FILTERS

BACKGROUND OF THE INVENTION

This application claims the priority of Korean Patent Application No. 2002-61214, filed Oct. 8, 2002, which is incorporated herein in its entirety by reference.

1. Field of the Invention

The present invention relates to optical clock recovery, and more particularly, to a method and apparatus of clock recovery using optical filters with fixed wavelengths.

2. Description of the Related Art

In order to increase the data transmission speed in an optical transmission system, a technique associated with an optical transmission unit for converting transmission data into an optical signal and transmitting the optical signal must first be improved, and a technique associated with an optical receiving unit for receiving a transmitted signal and restoring it to the original signal must also be improved in advance. Additionally, the signal processing speed in the optical receiving unit must be fast enough to prevent bottleneck. To demodulate a transmitted data signal at a high speed and with accuracy, optical clock recovery has been studied.

Examples of an optical clock recovery method being studied at present are a method using a self-pulsating phenomenon, which occurs in a laser diode, and a method using an optical loop mirror. However, these methods have disadvantages in that it is difficult to precisely manufacture a clock recovery device such as a phase locked loop (PLL) used for accurate clock recovery and that an optical transmission system is unstable because of the optical fiber that is very sensitive to changes in external environments, for example, a temperature change in the outside. To solve these problems, various methods have been disclosed.

Among the above-disclosed methods, there is a method of recovering a clock signal using particular spectral components that exist on the optical spectrum of a received optical signal. It can be seen from the optical spectrum of a received optical signal that the optical spectrum contains a few spectral lines whose magnitudes are relatively larger than those of the other spectral lines. A clock signal is recovered by extracting the largest spectral line at the central frequency and one of side spectral lines adjacent to the largest spectral line from the above-mentioned spectrum.

To be more specific, the magnitudes of two extracted spectral lines of the optical signal should be made equal by passing them through filters and an attenuator. Then, the resulting optical signal is received at a detector and is then subjected to beating in order to derive a signal corresponding to the frequency difference between the two spectral lines. The signal derived from the received optical signals through the beating process has the same frequency as the clock of the received optical signal. The received optical signal may be either a non return to zero (NRZ) type signal or a return to zero (RZ) type signal.

In the prior art, a tunable filter is used to extract the desired spectral lines and to make the magnitudes of two extracted spectral lines equal to each other. The tunable filter adjusts the magnitudes of two spectral lines, which can be different for each system due to the characteristics of an optical transmitter used in the optical transmission system, so that the magnitudes of the two spectral lines are made equal to each other.

However, the use of only one tunable filter have problems that the signal to noise ratio (SNR) of the system is limited by the small noise components that exist between the two extracted spectral lines in the optical spectrum and that a clock recovery device is expensive.

Furthermore, a tunable filter can make the two spectral lines equal in magnitude in certain range of the magnitude difference between the two extracted spectral lines. The noise components that exist between the two spectral lines are also extracted when the two spectral lines are extracted, thus the extracted noise components affect as noise that are also subjected to beating. Therefore, the performance of a clock recovery system can be degraded.

SUMMARY OF THE INVENTION

The present invention provides a clock recovery apparatus and method of recovering a clock from a data signal by extracting spectral lines while reducing the amount of noise components that are extracted.

According to an aspect of the present invention, there is provided a clock recovery apparatus using optical filters, in which a first filter receives an optical signal and extracts either one out of two spectral lines corresponding to two side peaks that are second in magnitude in spectrum and exist at both sides of the largest peak on the spectrum of the received optical signal. A second filter extracts a spectral line corresponding to the largest peak on the spectrum of the received optical signal. An attenuator equalizes the power levels of the two spectral lines selected by the first and second filters. A beating generation unit receives signals corresponding to the two equalized spectral lines and generates beating between the equalized spectral lines in order to recover a clock component.

According to another aspect of the present invention, there is provided a clock recovery method using optical filters. In this method, first, an optical signal is received, and one spectral line of the signal in the frequency domain is filtered out of two spectral lines corresponding to two side peaks that are second in magnitude and exist at both sides of the peak on the spectrum of the received optical signal. Next, a spectral line corresponding the largest peak on the spectrum of the received optical signal is filtered out. While extracting the largest spectral line, the power levels of the two filtered-out spectral lines are equalized by reducing the magnitude of the larger signal of the two through an attenuator. Then, signals corresponding to the two equalized spectral lines are received at a detector, and the two signals are subjected to beat each other generating a clock signal of which frequency is equal to the frequency difference between the two.

The present invention also provides a computer readable recording medium that records a computer program for executing the clock recovery method.

BRIEF DESCRIPTION OF THE DRAWINGS

The above and other aspects and advantages of the present invention will become more apparent by describing in detail preferred embodiments thereof with reference to the attached drawings in which.

DETAILED DESCRIPTION OF THE INVENTION

Figure 1:
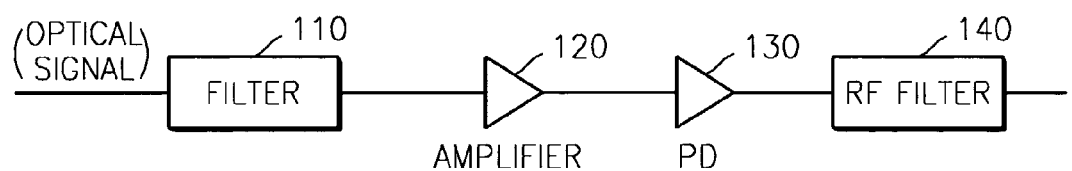
FIG. 1 is a block diagram of an optical receiving unit for optically recovering a clock.

Referring to FIG. 1, an optical receiving unit of optical clock recovery includes a filter 110, an amplifier 120, a photodiode (PD) 130, and an RF filter 140. If an NRZ type optical signal is received at a 40 Gb/s speed, the filter 110 extracts two spectral lines on the optical spectrum of a received optical signal. A tunable filter can be used as the filter 110. One of the two spectral lines is a spectral line at the center frequency. The other spectral line is one of two spectral lines at both sides of the spectral line at the center frequency. The amplifier 120 amplifies the optical powers of the two extracted spectral lines more than a minimal optical intensity to which the PD 130 can react.

Figure 2:
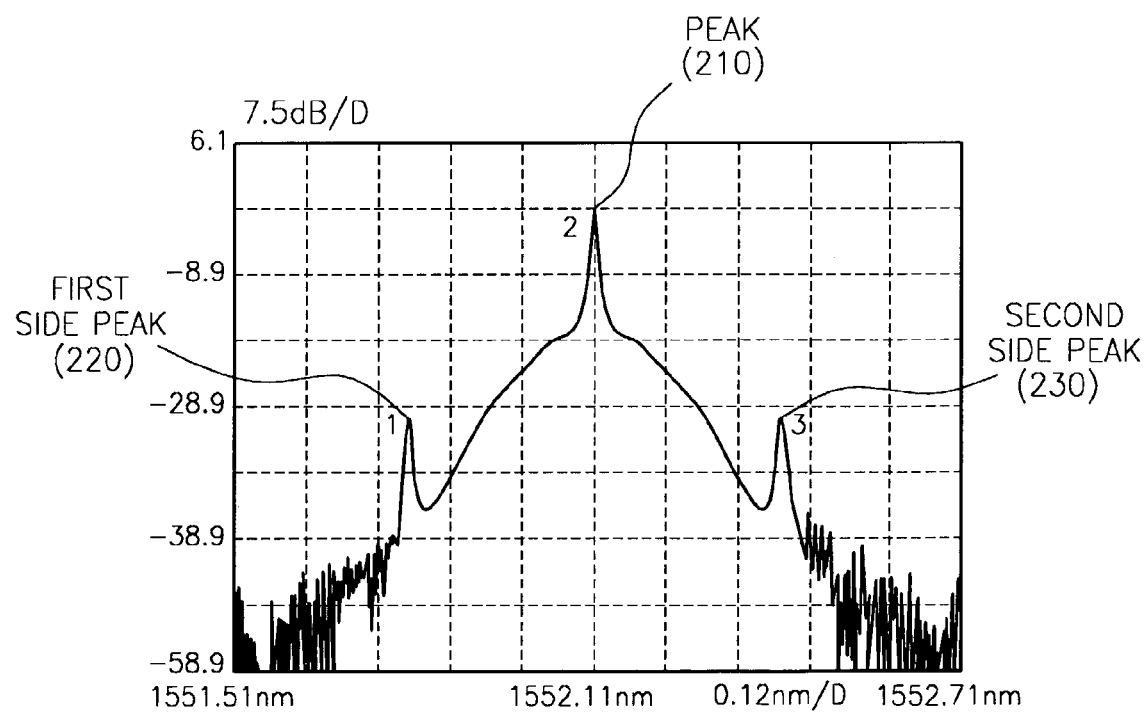
FIG. 2 shows the optical spectrum of an optical signal received at 40 Gb/s.

The PD 130 receives the two amplified spectral line signals and provokes beating in them in order to derive a new signal corresponding to the frequency difference between the two signals. If two spectral line signals with frequencies of f1 and f2, respectively, are received, signals with frequencies of f1+f2 and f1−f2 are derived. If the signal with the frequency of f1+f2 exists within a bandwidth in which the PD 130 can operate, an electrical signal corresponding to this case is generated. The signal with the frequency of f1−f2 is acquired by the RF band pass filter 140 installed at the rear of the PD 130. This extracted signal is the clock signal of the received signal. FIG. 2 shows the optical spectrum of an optical signal received at 40 Gb/s. That is, the optical spectrum shown in FIG. 1 is the optical spectrum of the optical signal at the input of the filter 110. The received optical signal is an NRZ type signal.

A peak 210 existing at the center of the optical spectrum represents the center frequency component of the received signal. First and second side peaks 220 and 230 existing at both sides of the peak 210 are generated due to the rising and falling time of transmission devices during modulation. The peak 210 representing the center frequency on the optical spectrum is spaced about 0.32 nm (=40 GHz) from either one of the side peaks 220 and 230. The frequency difference is equal to the clock frequency of the received signal. Accordingly, the peak 210 signal and one of the first and second side peaks 220 and 230 are selected using the above mentioned method, and the two selected signals are subjected to beating so as to obtain a signal with a frequency of |f1−f2|. In this way, a clock component is recovered.

Figure 3:
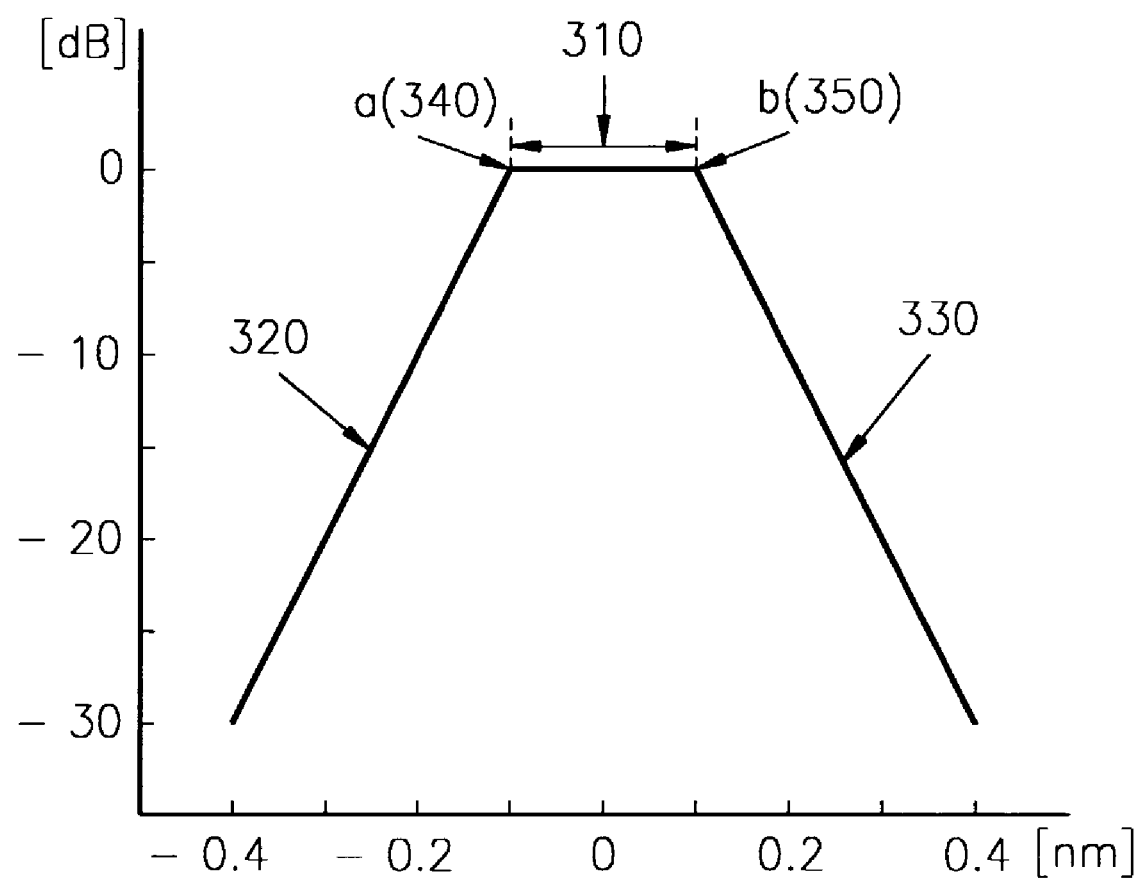
FIG. 3 shows the spectrum characteristics of a tunable filter designed to generate a beating process between two spectral line signals.

FIG. 3 shows the spectral characteristics of a tunable filter designed to provoke beating process between two spectral line signals. Upon the design of a filter, particularly, a width 310 at 0 dB and inclination 320 and 330 at both sides must be considered since they affect the amount of attenuation that can make the magnitudes of two spectral lines equal. In other words, the range of attenuation is determined by the width and inclination of the tunable filter's spectral characteristics.

Let's take an example for a received signal with the optical spectrum of FIG. 2. By moving the tunable filter with the spectral characteristics of FIG. 3, the first side peak 220 can be placed at the point a 340 in FIG. 3, and the peak 210 of FIG. 2 can be located around 0.22 nm, which is 0.32 nm spaced from the point a 340. In this case, the magnitude of the spectral line at the center frequency is attenuated by about 10 dB, which is the minimum amount of attenuation this tunable filter can achieve. On the other hand, if the tunable filter having the characteristics of FIG. 3 moves the passband of the filter so that the first side peak 220 of the signal with the optical spectrum of FIG. 2 is placed at the point b 350 of FIG. 3, the peak 210 of FIG. 2 is located around 0.42 nm, which is 0.32 nm spaced from the b point 350. For this case, the magnitude of the spectral line at the center frequency is attenuated by about 30 dB which is the maximum amount of attenuation. Thus, the filter having the characteristics of FIG. 3 can be optimally used only if the difference between the magnitude of the peak 210 and that of either side peak 220 or 230 ranges from 10 dB to 30 dB.

In addition, upon beating, it must be considered that the magnitudes of the two signals that undergo the beating process must be equal to each other. If the magnitudes of the two signals are different, as shown in FIG. 4B, it is hard to observe the beating due to the frequency difference between two signals.

Figure 4A:
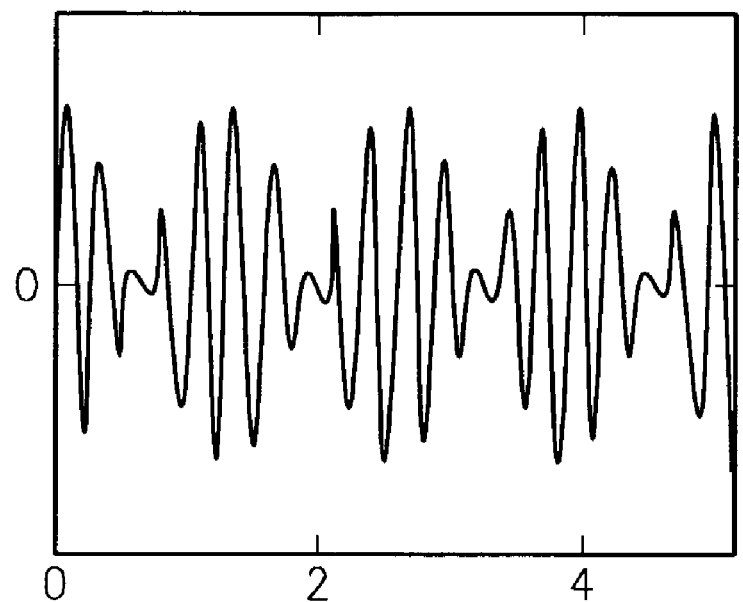
FIGS. 4A and 4B show beating results that may be obtained if there is a difference in magnitude between two frequency signals(B) and if there is no difference(A)
Figure 4B:
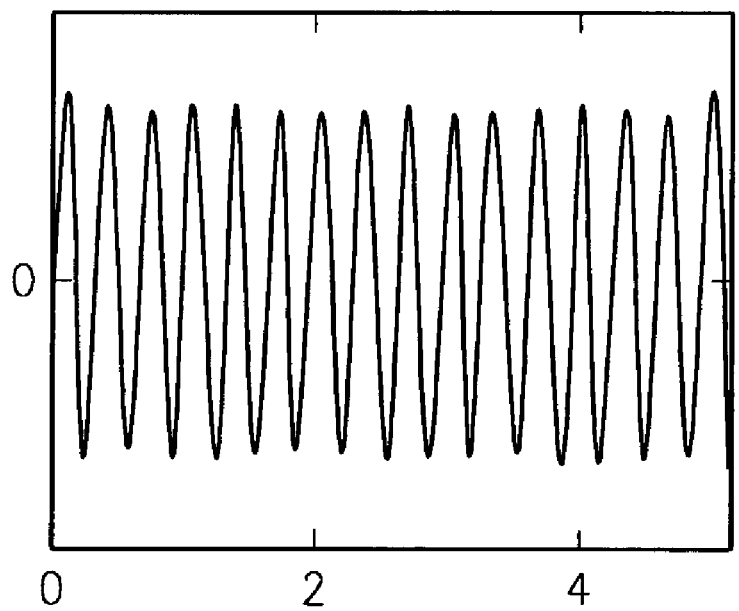

FIGS. 4A and 4B show the beating results that may be obtained if there is a difference in magnitude between the two signals. If a signal of sin (20$t$) and a signal of sin (25$t$) are mixed, a signal with a waveform as shown in FIG. 4A is obtained. If a signal of 2 sin (20$t$) and a signal of 0.1 sin (25$t$) are mixed, a signal with a waveform as shown in FIG. 4B is obtained. As shown in FIGS. 4A and 4B, if the two signals have the same magnitude, a signal corresponding to the frequency difference between the two signals is obtained as shown in FIG. 4A. If the two signals have different magnitudes, a beating effect does not nearly occur as shown in FIG. 4B. In other words, the frequency component corresponding to this beat signal can be negligible in the frequency domain. Thus, the magnitudes of two detected spectral line signals are required to be equal using a tunable filter.

A range in which the magnitudes of signals are adjusted to be equal to each other depends on the spectral characteristic of a tunable filter. If signals in which the difference in magnitude between the peak 210 and either of the first and second side peaks 220 and 230 deviates from the range of 10 to 30 dB are input to a filter having the characteristics of FIG. 3 for the above example, the magnitudes of the two signals can not be made equal. For this case, the filter cannot be optimally used.

That is, an unstable clock signal is obtained through beating. As described above, there exists a range in the amount of attenuation of the center frequency by the tunable filter, because the magnitude of the peak 210 should be made equal to that of either of the side peaks, 220 and 230, by the tunable filter. That is, the tunable filter can make a desirable beat signal for a certain range of the magnitude difference between the two extracted spectral lines. In a system for transmitting an optical 40 Gb/s NRZ signal with the optical spectrum of FIG. 2, the distance between the peak 210 and either of the first and second 220 and 230 is 0.32 nm (=40 GHz), thus the bandwidth 310 of the tunable filter at 0 dB must be less than 0.32 nm in order to effectively reduce noise. However, when such a tunable filter is used, small spectral lines existing between two extracted spectral lines are passed to the PD without being attenuated and act as noise. Consequently, the entire signal to noise ratio (SNR) cannot be improved beyond a certain value.

Accordingly, the small spectral line components do not always serve as noise, but this problem may occur frequently.

Figure 5A:
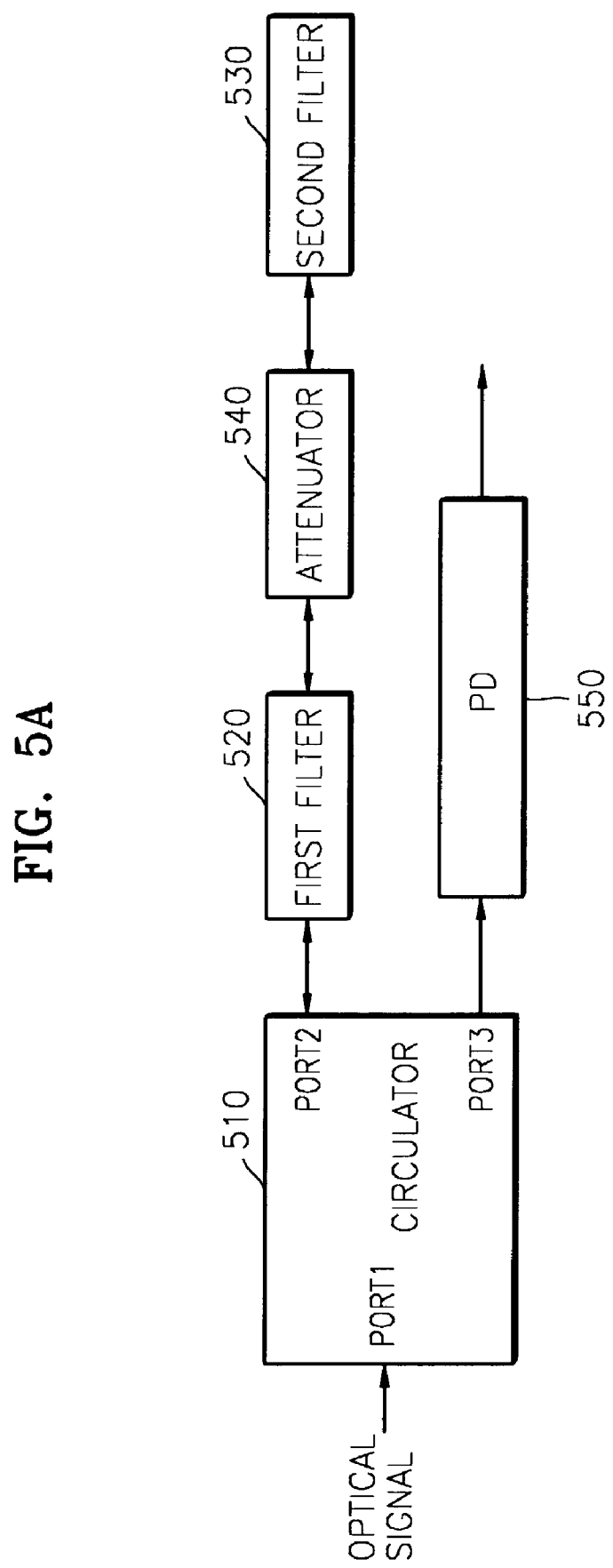
FIG. 5A is a block diagram of an apparatus for recovering a clock by extracting spectral lines using a filter with a fixed reflective wavelength.

FIG. 5A is a block diagram of an apparatus for recovering a clock by extracting spectral lines using filters with fixed reflective wavelengths. A circulator 510 prevents the optical signals reflected by filters 520 and 530 from being mixed with the incoming signal. The circulator 510, which is a 3-port device, further includes a port that outputs reflected waves received from the port 2. In other words, the circulator 510 has 3 ports in total, an input port, an output port, and a port for outputting a reflected signal received via the output port.

A signal received via a first port of the circulator 510 is output via a second port. A signal received via the second port is output via a third port. A signal received via the third port is output via the first port.

The first filter 520 extracts a spectral line corresponding to either the first or second side peak 220 or 230 and reflects it back to the circulator.

Similarly, the second filter 530 reflects back a spectral line corresponding to the peak 210 to the same port as it came out. Note that, in the invented system, the signal having the wavelength corresponding to the largest peak experiences attenuation by passing the attenuator 540 while propagating towards the second filter 530 and reflecting back to the circulator 410 by the second filter 530. Thus, by adjusting the attenuator, its magnitude can be made equal to the magnitude of either the first or second side peak 220 or 230 extracted.

An attenuator 540 equalizes the power levels of extracted spectral lines.

A PD 550 receives the two spectral lines whose magnitudes were made equal through the attenuator and provokes beating between the received signals, thereby generating a clock component.

As described above, when a tunable filter is used, a range of attenuation in which the magnitude of a spectral line at the peak 210 is made equal to the magnitude of a spectral line at either the first or second side peak 220 or 230 is determined by the spectrum characteristic of the tunable filter. However, in the clock recovery apparatus of the present invention, the magnitudes of two spectral lines can be made equal using the attenuator 540, no matter what magnitude difference exists between the spectral line at the peak 210 and that at either the first or second side peak 220 or 230. By using a filter with a narrow bandwidth to implement each of the first and second filters, 520 and 530, noise components existing between two spectral lines can be further reduced, and consequently the noise level that may be generated during the beating process in the PD 550 can be lowered.

Figure 5B:
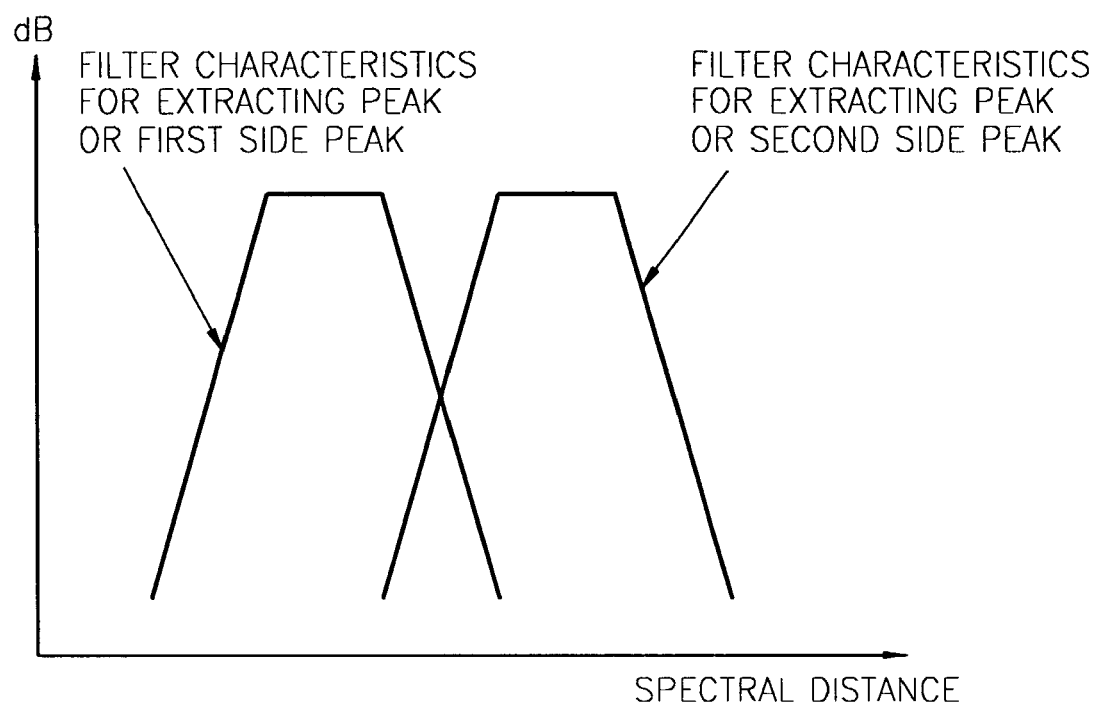
FIG. 5B shows the spectral characteristics of a filter for extracting a peak 210 and a first side peak 220 or the spectral characteristics of a filter for extracting the peak 210 and a second side peak 230.

FIG. 5B shows the spectral characteristics of filters for extracting the peak 210 and the first side peak 220, or the spectral characteristics of filters for extracting the peak 210 and the second side peak 230.

Figure 6:
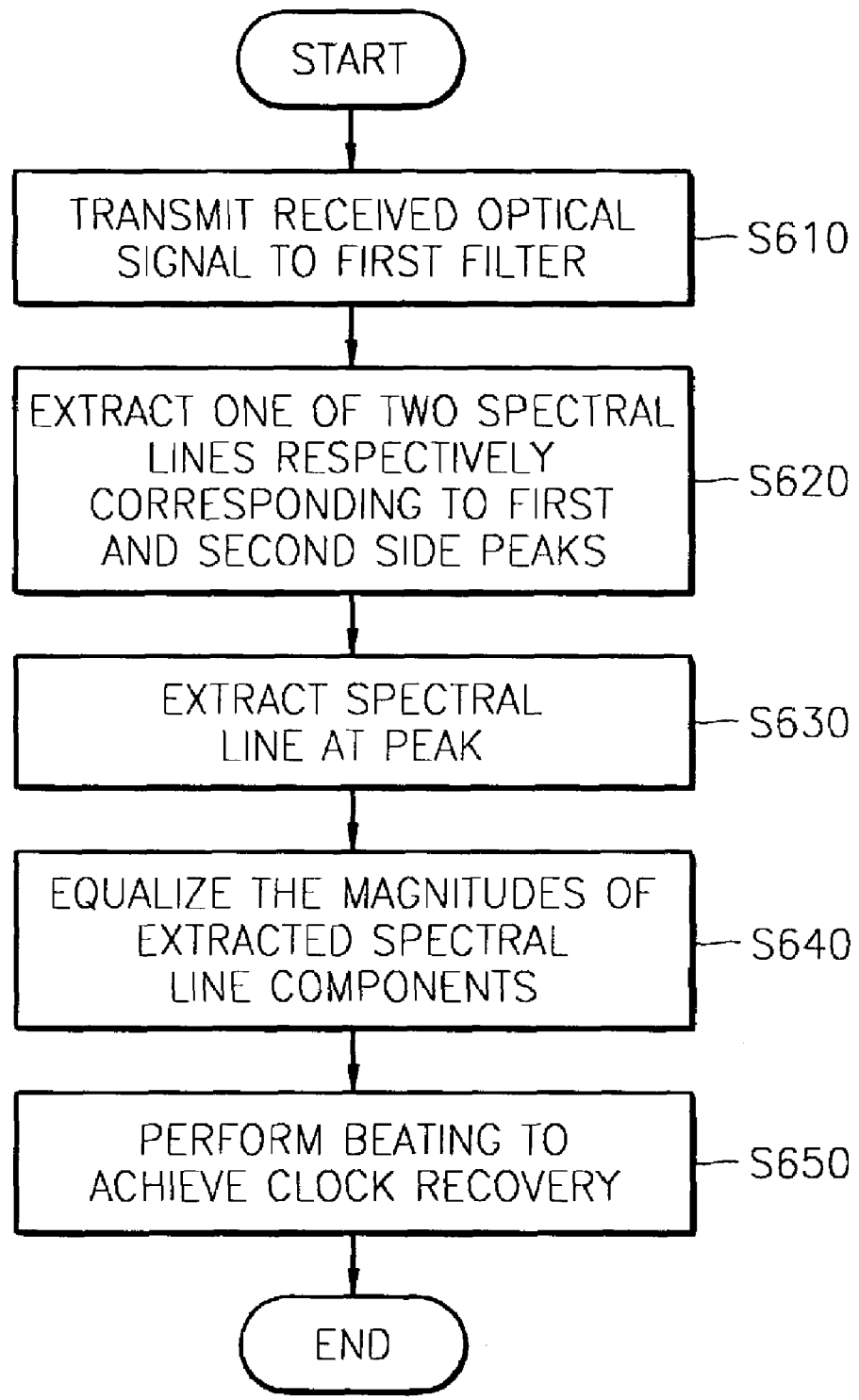
FIG. 6 is a flowchart illustrating a clock recovery method according to the present invention.

FIG. 6 is a flowchart illustrating a clock recovery method according to the present invention. First of all, in step S610, a received optical signal is transmitted to the first filter 520 via the circulator 510. In step S620, one of two spectral lines corresponding to either the first or second side peaks 220 and 230 existing on both sides of the peak 210 on the spectrum of the transmitted optical signal is extracted.

In step S630, a spectral line corresponding to the peak 210 on the spectrum of the transmitted optical signal is extracted.

In step S640, the power levels of the extracted spectral lines are adjusted to be the same. Finally, in step S650, the adjusted spectral lines are subjected to beating, thereby recovering a clock component.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and so on. Also, the computer readable codes can be transmitted via a carrier wave such as Internet. The computer readable recording medium can also be distributed over a network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

As described above, a clock recovery apparatus according to the present invention can be manufactured at a lower cost than when only one tunable filter is used, and can be easily controlled. In addition, noise components existing between two extracted spectral lines are reduced, thereby improving the SNR.

What is claimed is:

1. A clock recovery apparatus using optical filters, the apparatus comprising:
   a first filter receiving an optical signal and extracting one out of two spectral lines corresponding to two side peaks that are second in magnitude to a third peak and exist at both sides of the peak on the spectrum of the received optical signal;
   a second filter extracting a spectral line corresponding to the third peak on the spectrum of the received optical signal;
   an attenuator equalizing the power levels of the two spectral lines extracted by the first and second filters; and
   a beating generation unit receiving signals corresponding to the two equalized spectral lines and generating beating between the equalized spectral lines in order to recover the clock component.

2. The clock recovery apparatus of claim 1, further comprising a circulator receiving the optical signal via a port, transmitting outputting the received optical signal to another port, and preventing the received optical signal from being mixed with a signal reflected by the first or second filter.

3. The clock recovery apparatus of claim 1, wherein the beating generation unit is a photodiode.

4. The clock recovery apparatus of claim 1, wherein the beating generation unit receives the signals corresponding to the two equalized spectral lines, derives a signal with the frequency corresponding to the frequency difference between the two received signals, and outputs the derived signal as a clock signal.

5. The clock recovery apparatus of claim 1, wherein at least one of the first and second filters is a filter with a narrow reflective wavelength bandwidth.

6. The clock recovery apparatus of claim 1, wherein at least one of the first and second filters is a filter with a fixed reflective wavelength bandwidth.

7. A clock recovery method using optical filters, comprising:
- receiving an optical signal and extracting one out of two spectral lines corresponding to two side peaks that are second to a third peak in magnitude and exist at both sides of the peak on the spectrum of the received optical signal;
- extracting a spectral line corresponding to the third peak on the spectrum of the received optical signal;
- equalizing the power levels of the two extracted spectral lines; and
- receiving signals corresponding to the two equalized spectral lines and generating beating between the equalized spectral lines in order to recover a clock component.

8. The clock recovery method of claim 7, wherein at least one of the side peak filtering step and the peak filtering step is performed using a filter with a narrow reflective wavelength bandwidth.

9. The clock recovery method of claim 7, wherein at least one of the side peak filtering step and the peak filtering step is performed using a filter with a fixed reflective wavelength bandwidth.

10. The clock recovery method of claim 7, wherein in the clock component recovering step, the signals corresponding to the two equalized spectral lines are received, a signal with a frequency corresponding to the frequency difference between the two received signals is derived from the received signals, and the derived signal is output as a clock signal.

11. A computer readable recording medium which stores a computer program for executing a clock recovery method using optical filters, the method comprising:
- receiving an optical signal and extracting one of two spectral lines corresponding to two side peaks that are second to a third peak in magnitude and exist at both sides of a peak on the spectrum of the received optical signal;
- extracting a spectral line corresponding to the third peak on the spectrum of the received optical signal;
- equalizing the power levels of the two filtered-out spectral lines; and
- receiving signals corresponding to the two equalized spectral lines and generating beating between the equalized spectral lines in order to recover a clock component.

* * * * *